Feb. 24, 1959 R. W. VAN SCOY 2,875,152
PROCESS FOR THE PREPARATION OF GREASES GELLED
WITH NON-SOAP GELLING AGENTS
Filed Dec. 20, 1955
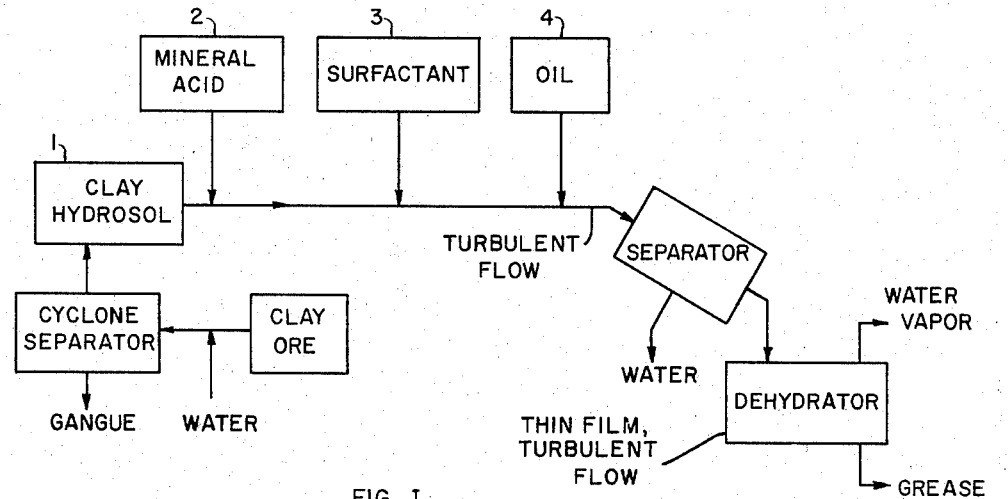
FIG. I
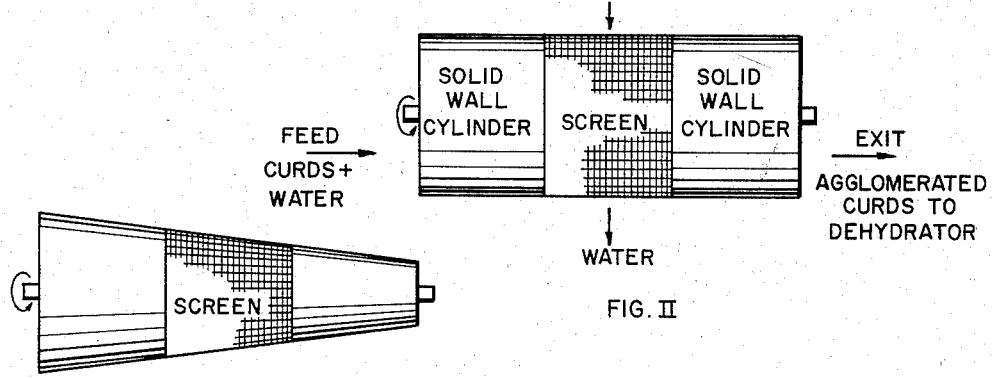
FIG. II
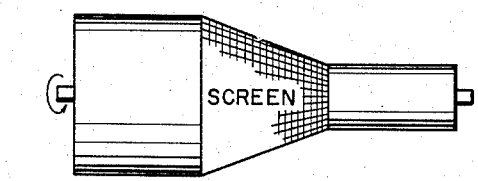
FIG. II B
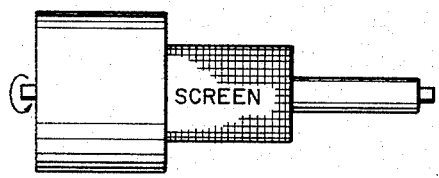
FIG. II C
INVENTOR:
ROBERT W. VAN SCOY
BY: William H. Myers
HIS AGENT

2,875,152

PROCESS FOR THE PREPARATION OF GREASES GELLED WITH NON-SOAP GELLING AGENTS

Robert W. Van Scoy, Concord, Calif., assignor to Shell Development Company, New York, N. Y., a corporation of Delaware Application December 20, 1955, Serial No. 554,196

5 Claims. (Cl. 252—28)

This invention relates to an improved process for the preparation of grease compositions. More particularly, it is concerned with a process for the rapid preparation of grease compositions having improved properties.

Greases have been prepared during the past few years by gelling oils with a variety of gelling agents based upon inorganic colloidal materials, such as amorphous colloids (including silica) as well as crystalline colloids (such as clays and the like). The principal problem in the past has been the elimination of water from the expanded colloidal material and the incorporation of the colloid in its expanded condition in a lubricating oil to form a grease composition. Normally this has been effected by a process involving the formation of aerogels, or by solvent transfer, in which the water is replaced with a water-miscible organic liquid which in turn is then replaced with a lubricating oil so as to maintain the colloidal substance in unshrunken condition, as in U. S. Patent 2,515,145.

A further alternative has been to attempt the "direct transfer" of the colloid from a hydrogel state to an oleogel state by the addition of a hydrophobic surfactant. Under these conditions, the surfactant performs a dual function, namely, serving in the transfer of the colloid from water to oil, and protecting the colloid from disintegration in subsequent use if and when water comes in contact with the grease composition. In the absence of a hydrophobic surfactant inorganic colloid greases disintegrate with loss of the grease structure. The presence of the hydrophobic surfactant causes separation of the greater amount of water from the hydrogel which can be removed by such simple means as filtration. The remaining water is thereafter separated by distillation, thus leaving a substantially anhydrous composition which can be homogenized to form a grease.

While the latter process overcomes a number of expensive and cumbersome steps required in the aerogel process, it nonetheless inherently requires several steps adding to the cost of the final product and also results in a grease having certain properties which it is desired to improve.

In order to create a proper dispersion of the inorganic colloid prior to water removal in the presence of oil, it normally has been necessary in the "direct transfer process" to pre-mill the hydrated product. That is, the inorganic colloid dispersed in at least part of the water originally present and in oil, must be passed through a shearing or homogenizing apparatus prior to complete dehydration if a satisfactory highly dispersed form of the colloid is to be obtained. Moreover, subsequent to complete dehydration it has normally been necessary to pass the grease-forming ingredients through a region of intense homogenizing in order to obtain a grease having the proper penetration and other desirable grease-like properties. While these two homogenizing or shearing steps give a product of normally satisfactory operating characteristics, certain defects are inherent in the resulting product. The most serious of these is referred to as "slumping."

Slumping implies an instability in a grease structure which is normally exhibited in the utilization of the grease, in that the grease settles in a bearing housing during quiescent periods, thus exposing part of the bearing to metal-to-metal contact whenever the bearing is subsequently operated. The exact reason for this poor slumping quality of the grease has not been ascertained but the present investigation to be described hereinafter had as one of its primary objects the elimination of the poor slumpability of the grease.

Another factor which is especially important with respect to the cost of these grease compositions comprises the amount of inorganic colloid required to give a grease of a stated consistency, i. e., yield; this is important not so much because of the cost of the inorganic colloid, but rather because of the relatively high cost of the hydrophobing agent. It is necessary to employ a certain ratio of hydrophobing agent to inorganic colloid in order to obtain the proper transfer from water to oil and, subsequently, to result in a grease having optimum hydrophobing properties. Consequently, if the amount of inorganic colloid can be reduced by any means to a lower figure than heretofore possible, then the hydrophobing surfactant requirement is also reduced and the cost of the final grease composition is materially decreased.

Another factor influencing the quality of the grease comprises the tendency of most surfactants, and more particularly the cationic surface active agents, to decompose at high temperatures in the presence of water. This is especially evident in the final step of most previous grease preparation procedures, wherein the grease composition containing water was maintained at a temperature sufficient to eliminate the water by evaporation for extended periods of time. It has been the experience of manufacturers carrying out this step to find that the final product shows evidence of decomposition of cationic surfactants, such as alkylammonium salts, as indicated by an objectionable ammoniacal odor of the grease even after substantial dehydration and de-aeration. Consequently, any step which would materially decrease the period when this decomposition is most evident would be of benefit.

Finally, the operating costs in the preparation of the subject class of grease compositions is dependent in part upon the relatively long residence time necessary in former procedures wherein water must be evaporated or other means used for homogenizing the grease or permitting sufficient time for water to separate from the partly hydrated intermediate products.

It is an object of the present invention to improve the preparation of inorganic colloid greases. It is another object of this invention to improve the process for the preparation of greases gelled with hydrophobic clays. It is a further object of this invention to provide a grease composition having improved yield value. A further object of the invention is to provide a grease exhibiting improved slumping characteristics. Still a further object of the invention is to provide a process for the preparation of greases having reduced cost both from ingredient requirements and from plant residence time. The foregoing objects will be better understood, and other objects will become apparent from the description of the invention, which will be made with reference in part to the accompanying drawing, wherein:

Fig. I is a flow diagram of the claimed process and Fig. II—IIC represent various dewatering devices.

Now, in accordance with the present invention, an improved process for the preparation of greases gelled with inorganic colloids has been found to comprise the following essential steps: Forming a salt-free hydrosol of an inorganic colloid; forming a liquid body of a cationic hydrophobic surface active agent; commingling the hydrosol and liquid body of the surface active agent within the proportions set forth hereinafter; adding to the mixture so formed a hydrophobic lubricating oil under such conditions that turbulent flow of the mixture is produced at a temperature between about 150° F. and about 250° F. for a residence period of between about 0.05 and about 5 seconds, whereby large amounts of water are separated from oily curds in which the colloid and surface active agent are suspended together with the remaining minor amount of water; passing the described mixture from the zone of turbulent flow over a perforated surface, whereby water separated in the previous step is removed from the oily curds; passing the wet oily curds over a surface having a skin temperature between about 320° F. and about 370° F. for a period between about 1 and about 30 seconds under turbulent flow conditions, the film being between about 0.005 and about 0.03 inch in thickness, whereby the water content of the grease is reduced so as to produce a substantially anhydrous composition, the resulting substantially anhydrous product having a grease structure of relatively low penetration without being required to pass through any subsequent homogenizing or shearing steps.

By the above process, it will be seen that the grease is subjected to elevated temperatures for a total time of less than one minute and usually for a total time of less than about 20 seconds from the time of oil addition to the emergence of the completed grease composition from the thin-film turbulent-flow dehydrator. Thus, the grease is subjected to those conditions conducive to surface active agent decomposition for a minimum of time. Furthermore, it has been unexpectedly found that the grease obtained by the above-described process has a surprisingly improved yield value and improved slumping characteristics. Also, as stated hereinabove, the use of turbulent flow conditions in the water separation step and in the subsequent dehydration step eliminates the necessity for subjecting the grease to the two homogenizing steps previously required.

In further accordance with the present invention, the dehydration step is preferably conducted in a tubular heat exchange apparatus fitted with close fitting rotating vanes as described more fully hereinafter. This agitator is preferably operated at a speed of 1000–2500 R. P. M., rather than at higher or lower speeds. Under these conditions it has been found that greases having the highest consistency are formed. If lower or higher speeds are utilized even though the other conditions such as film thickness and temperature as well as residence time are kept constant, the greases produced have relatively higher penetrations for a given colloid content.

In the general description of the process, reference is made to Fig. I, wherein 1 represents a supply of the clay hydrosol (or other salt-free hydrated colloid suspension), which is combined with a strong inorganic acid from storage tank 2 prior to incorporation of a hydrophobic surface active agent in liquid form from source 3; the mixture so formed being combined under turbulent flow conditions with a lubricating oil from tank 4 and passing to a water separator 5 wherein water is drained and hydrated oily curds containing the surfactant and colloid are passed to a thin film turbulent flow dehydrator 6 wherein substantially all of the remaining water is removed to produce a product having a grease structure exhibiting unexpectedly improved yield characteristics and slumping properties.

While the process may be run in a batch manner, it is preferred that continuous operation be employed. In the following description of the individual steps, reference will be made to the use of a high base exchange clay as the gelling colloid. However, as given in further detail hereinafter, other inorganic colloids may be employed in place of or in addition to the clay.

The aqueous clay suspension is formed by dispersing clay in water to form a hydrosol having between 0.25% and 3% by weight of clay based on the de-gangued product. Clay in its natural state normally contains appreciable amounts of non-clay material referred to variously as calcite, gangue or to other non-colloidal material. This must be separated from the product in order that an abrasion-free grease may be produced. The crude clay is dispersed in water by means of agitation and preferably is passed to a cyclone separator wherein the gangue is removed and the resulting hydrosol (i. e., clay suspension) is then sent to the grease plant. A suitable type of cyclone separator is marketed under the trade name "Dorclone." Gangue separation is most efficient when this apparatus is operated at greater than 100 lb./in.$^2$ differential pressure.

In order to activate the clay for proper grease formation it is preferable (although not essential) to incorporate therewith a strong mineral acid (nitric, sulfuric, phosphoric or hydrochloric acids) from storage tank 2 in an amount between about 4% and about 20% by weight based on the dry weight of the clay.

Subsequent to acid addition, the hydrosol is mixed with a hydrophobic surface active agent in liquid form. The liquid form may be the result of melting the surfactant or may comprise forming a solution thereof in any suitable solvent. It is preferred that between about 40% and about 100% by weight of the surfactant, based on dry clay, be commingled with the clay hydrosol. Also, it is preferred that these mixtures be formed at temperatures between about 110 and 200° F.

Immediately after the addition of the liquefied surfactant a hydrophobic lubricating oil is incorporated under conditions of turbulent flow, such as in a restricted pipe section, the size of which is chosen so as to produce a turbulent flow of the resulting mixture for a period of at least 0.05 second up to about 5 seconds in order to produce maximum contact and promote a separation of the great majority of water present originally in the clay hydrosol. The water separates into one phase, while the oil containing the colloid coated with the surfactant and a small amount of water (less than 30% by weight) separates into another phase.

The mixture so produced is preferably passed thereafter to a separating zone such as a rotating (3–15 R. P. M.) slanting circular screen as shown in Fig. II, wherein the separated water is drained from the product. An especially effective water separator comprises three sections of a hollow open-end cylinder or truncated cone. The sections adjacent to each end should be solid walls while the mid section is a perforated wall or screen. As the mixture enters the rotating separator, the oily curds agglomerate into a rope-like body. Due to the extremely sticky character thereof, all the fines are agglomerated therewith prior to reaching the perforated mid section. Upon reaching the latter, the water which has separated falls through the screen while the curd is retained. A current of gas is blown inwards from the top section of the screen zone so as to assist in separating water and in detaching the sticky curds from the surface of the screen. The curds then pass onto the solid circular sleeve constituting the after-end of the separator, the sleeve rotating in such a manner as to promote formation (or maintenance) of a continuous rope-like body of the curds so as to provide a constant feed to the dehydrator. Due to the fact that a large volume of water is present as the mixture enters the separator, the latter may be larger at the feed end than at the exit, the shapes suitable for the purpose being illustrated in Figs. IIA and IIB. Fig. IIC represents a form not to be employed, since the sticky curd is caught in corners 10 and 20 and accumulates, eventually causing a stoppage due to plugging. The separator may constitute a single continuous piece of apparatus or may be three discontinuous zones, each rotating at a speed optimum for its function and volume of material being carried. The interior angles between zones of progressively decreasing size should be greater than 90° so as to prevent the plugging which occurs with an apparatus such as illustrated in Fig. IIC.

The partially dehydrated product thereafter is passed to a thin-film turbulent-flow dehydrator. The purpose of this dehydrator is to remove the remaining undesired amounts of water in a minimum length of time and, simultaneously, to treat the grease in such a manner that subsequent homogenizing is unnecessary. While these features would in themselves be highly desirable, it is also desired in this particular step, combined with those which preceded it, to improve the properties of the grease, particularly the slumping characteristics and consistency thereof as well as to minimize any tendency toward decomposition of the cationic hydrophobic surface active agent present in the mixture.

In accomplishing each of these aims it has been found essential to pass the partially de-watered mixture over a heated surface in a film between about 0.005 and about 0.030 inch in thickness, while simultaneously moving the film by means of rotating vanes so that turbulent flow of the mixture results. The most practical form of such an apparatus is that of a tube surrounded by a heated jacket such as a steam jacket, the grease film being passed along the inner surface of the tube by means of rotating parallel vanes concentrically placed therein.

It has been found, in accordance with one feature of this invention, that the speed at which this scraper moves materially affects the properties of the grease, especially as measured by the consistency thereof. When the skin temperature of the dehydrator is between about 320 and about 370° F., and when using a residence time of between about 3 and about 30 seconds, the rotating scraper should be operated at a speed between about 1000 and about 2500 R. P. M. in order to obtain the maximum consistency of the grease. When the rotating blade is operated at lower speeds, the water is not removed to its maximum extent during the recited residence period and the grease is relatively soft. If operated above about 2500 R. P. M. under the recited time and temperature conditions, the grease is also relatively soft, although the reason therefor is obscure at the present time.

When the rotating scraper is operated at speeds below about 1000 R. P. M., it has been found that the grease film proceeding through the dehydrator exists in two layers, namely a disturbed layer nearest the scraper edge and a relatively static layer based immediately upon the heat exchange surface. Due to the static nature of this adjacent latter layer, the heat exchange is only about 10 or 20% of that obtained when higher speeds are employed. Consequently, the composition requires relatively longer times of dehydration in order to remove a given amount of water and thus the cationic surfactant is subjected to decomposing conditions wherein undesirable amounts of ammonia are formed upon disintegration of the surfactant.

The term "substantially anhydrous" as utilized throughout this specification refers to a grease composition containing no more than about 0.2% (preferably less than 0.1%) by weight of free water (that is, not including water chemically bound in the colloid molecule, as in clays).

The lubricating oil which may be used in the described process may be mineral oil or any of the well known synthetic lubricants as long as they are substantially insoluble in water. Synthetic lubricants include synthetic liquid hydrocarbons such as various alkylated aromatic hydrocarbons, preferably tertiary butylated naphthalenes; polymerized olefins such as liquid polyethylenes, polybutylenes, and the like. Other oleaginous liquids include aliphatic diesters formed between dicarboxylic acids having from four to twelve carbon atoms and aliphatic monohydric alcohols having from two to sixteen carbon atoms per molecule; aliphatic esters of phosphorous acids including phosphates, phosphonates and phosphinates, and polyoxyalkylene fluids and tetraalkyl silicates. Typical species of these various classes of lubricants include bis(2-ethylhexyl)sebacate, bis(n-butyl) adipate, trioctyl phosphate, tricresyl phosphate, mixed alkylaryl phosphates such as dioctyl cresyl phosphate, silicone fluids such as dimethyl silicones and methylphenyl silicones, tetraalkyl silicates having from three to twelve carbon atoms per alkyl group including tetrabutyl silicate, tetrahexyl silicate and tetraoctyl silicate; and non-flammable lubricants including halogenated hydrocarbons such as hexachlorobutadiene and chlorofluorocarbons.

The hydrophobic surface active agents to be employed in the subject process are preferably cationic in character and may be either adsorbed on the surfaces of or reacted with the surface of the inorganic colloidal gelling agent. Preferably, the surfactants are adsorbed upon the colloid surface rather than chemically reacted therewith. However, in the case of clays, for example, having high base exchange capacity, the possibility exists for replacement of exchangeable base metals (such as sodium) with radicals such as hydrophobic onium radicals. Greases of this type are described in the Jordan patent, U. S. 2,531,440. The adsorption of hydrophobic cationic surfactants is described in Stross, U. S. 2,623,853. With most amorphous colloidal gelling agents, the cationic surfactants are adsorbed on the colloidal surfaces.

Suitable cationic surfactants comprise or are obtained from amines and quaternary ammonium compounds containing at least one aliphatic hydrocarbon chain having eight or more carbon atoms. Typical ammonium salts include dimethyl dioctadecyl ammonium chloride, dimethyl dihexadecyl ammonium chloride and dimethyl octadecenyl octadecyl ammonium chloride. The corresponding bromides, acetates or hydroxides may be employed. Fatty amines containing at least eight carbon atoms and preferably 12–24 carbon atoms per molecule also may be utilized. Typical species of these include primary amines such as dodecyl amine, heptadecyl amine and octadecyl amine. Cyclic amines such as alkylated imidazolines (e. g., heptadecylimidazolin) and hydroxyalkylimidazolin may be utilized. Polyamines have been found to be especially suitable and include not only the unsubstituted amines, but also the amido amines formed therefrom, the amido groups being prepared by amidation of a portion of the amino groups present with carboxylic acids, preferably of the aryl or aliphatic fatty acid types, including tall oil acids, naphthenic acids, rosin acids and animal fatty acids, all of which should contain at least 8 carbon atoms per molecule and preferably no more than about 36 carbon atoms per molecule. The polyamines may contain additional substituents such as hydroxyl groups. In fact, hydroxy alkylene polyamines, especially in the form of their amido amines, are particularly effective hydrophobing surface active agents for the present compositions. Likewise, condensation products of ammonia with epihalohydrins, when utilized in the form of their fatty acid amido amines, are particularly superior hydrophobing agents. The latter class are fully described in Peterson patent, U. S. 2,623,852.

The colloidal gelling agents utilized in these compositions may be either the clay materials described in the Jordan patent referred to above or may be amorphous inorganic colloids such as silica, alumina, lime, magnesia, and combinations thereof.

Greases prepared according to the present invention normally contain from 2 to 30% by weight, based on the total grease, of inorganic colloidal material and from 10 to 100% by weight, based on the inorganic colloid, of the cationic surface active agent. Preferably, the greases will contain from 3 to 10% by weight of inorganic colloid, based on the total grease, and 25 to 75% by weight of the surfactant, based on the colloid.

*Example*

In carrying out the process of this invention, the following is illustrative:

A slurry of water and crude Hectorite clay was passed through 2 Dorclone cyclone separators arranged in series under a differential pressure of about 120 lb./in.$^2$ in each separator. This resulted in the elimination of all gangue, leaving a slurry of 2% clay and 98% water, which was modified by the addition of phosphoric acid in an amount of 7%, based on the dry weight of the clay. The acidified clay slurry was heated to about 200° F. and modified by the addition of melted surfactant (60% based on clay) and hot (200° F.) mineral lubricating oil (18 parts per part of clay). The resulting mixture was passed through a pipeline under turbulent flow conditions for about 0.1 second before dumping into the rotating (15 R. P. M.) de-watering device.

The mixture separated into water phase and a ropy phase of agglomerated curds containing oil, clay, surfactant and a small amount of water. This passed down the inclined apparatus to a rotating screen section, where the water fell through the screen. A stream of air, blowing inwards through the top of the rotating screen released the sticky curd, which continued down the inclined solid walled cylinder (see Fig. II) after-portion of the de-watering device. The de-watered curd was fed continuously into a vertically positioned tube in which a skin temperature of about 350° F. was maintained. Concentrically positioned vanes, rotating at a speed of about 1800 R. P. M. resulted in a turbulent film of the wet grease about 0.02 inch thick being formed. A counetr-current stream of air swept out the water vapor being eliminated from the wet grease. The grease, which was odorless and substantially anhydrous at the end of 20 seconds, required no further milling, since it had a micropenetration of 220 dmm. and exhibited substantially no slumping under a standard slumping test.

The same grease was prepared, insofar as ingredients and proportions were concerned, by the previously useful "direct transfer" process. It was found to have a penetration of 275 dmm. and a slump value of 80%. The surfactant utilized in both greases was a condensation product of epichlorohydrin and ammonia, about ⅓ of the amino groups being amidized with tall oil acids.

The "direct transfer" process, used for the preparation of the softer comparative grease, involved addition of the surfactant and oil to a kettle containing the stirred clay slurry. This caused curd formation and water separation, the latter being drained. The wet curd had to be passed through a high speed pump ("pre-milled") prior to dehydration. If this step was omitted, the grease eventually formed had poor yield and low work stability. The pre-milled curd was stirred in a kettle at about 220° F. until it was substantially anhydrous. This required such an extensive period that the resulting grease had an ammoniacal odor, indicating some decomposition of the surfactant. The soft anhydrous product required several passes through a colloid mill in order to obtain a satisfactory grease structure.

I claim as my invention:

1. The process for the preparation of a grease composition which comprises:

(1) Forming a liquid hydrosol of a substantially grit-free clay;

(2) Forming a liquid body of a cationic hydrophobic surface active agent;

(3) Continuously intimately commingling the hydrosol and liquid body;

(4) Continuously and intimately commingling the mixture so formed with a major proportion of a mineral lubricating oil in a restricted pipe section at a temperature between about 150° F. and about 250° F. for a residence period of between about 0.05 and 5 seconds whereby water separates from oily curds in which a grease-forming proportion of the clay and 40–100% by weight based on the clay of surface active agent are suspended together with less than about 30% by weight of water;

(5) Continuously passing the mixture so obtained over a rotating solid surface whereby the curds are shaped into a ropy mass, passing the latter mass together with the separated water over a rotating perforated surface whereby water so separated is removed from the oily curds;

(6) Continuously passing the oily curds over a surface having a skin temperature between about 320° F. and about 370° F. for a time between about 1 second and about 30 seconds in the form of a film between about 0.005 and about 0.03 inch in thickness by means of blades rotating at a rate of 1000–2500 revolutions per minute, whereby the water content of the oily curds is reduced below about 0.1% by weight, whereby a substantially anhydrous grease structure is formed.

2. The process for the preparation of a grease composition which comprises:

(1) Forming a liquid hydrosol of a substantially grit-free clay;

(2) Forming a liquid body of a cationic hydrophobic surface active agent;

(3) Intimately commingling the hydrosol and liquid body;

(4) Commingling the mixture so formed with a major proportion of a hydrophobic lubricating oil in a restricted pipe section at a temperature between about 150° F. and about 250° F. for a residence period of between about 0.05 and 5 seconds whereby water separates from oily curds in which a grease-forming proportion of the clay and 40–100% by weight based on the clay of surface active agent are suspended together with less than about 30% by weight of water;

(5) Passing the mixture so obtained over a rotating solid surface whereby the curds are shaped into a ropy mass, passing the latter mass together with the separated water over a rotating perforated surface whereby water so separated is removed from the oily curds;

(6) Passing the oily curds over a surface having a skin temperature between about 320° F. and about 370° F. for a time between about 1 second and about 30 seconds in the form of a film between about 0.005 and about 0.03 inch in thickness by means of blades rotating at a rate of 1000–2500 revolutions per minute, whereby the water content of the oily curds is reduced below about 0.2% by weight, whereby a substantially anhydrous grease structure is formed.

3. Process according to claim 1 wherein the hydrosol contains 0.25–3.0% by weight of clay.

4. Process according to claim 1 wherein the surface active agent is an amino amide of an aliphatic polyamine.

5. Process according to claim 4 wherein the surface active agent is an amino fatty acid amide of a polyalkylene polyamine.

References Cited in the file of this patent

UNITED STATES PATENTS

| | | |
|---|---|---|
| 2,623,853 | Stross | Dec. 30, 1952 |
| 2,681,314 | Skinner et al. | June 15, 1954 |

FOREIGN PATENTS

| | | |
|---|---|---|
| 154,698 | Australia | Feb. 15, 1951 |
| 706,772 | Great Britain | Apr. 7, 1954 |